US012340378B2

(12) United States Patent
Li et al.

(10) Patent No.: US 12,340,378 B2
(45) **Date of Patent: *Jun. 24, 2025**

(54) EVENT-BASED CONTACT CENTER DEPLOYMENT AND TERMINATION

(71) Applicant: Zoom Video Communications, Inc., San Jose, CA (US)

(72) Inventors: Jin Li, Los Gatos, CA (US); Xu Hua Li, San Jose, CA (US)

(73) Assignee: Zoom Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/436,793

(22) Filed: Feb. 8, 2024

(65) Prior Publication Data

US 2024/0185258 A1 Jun. 6, 2024

Related U.S. Application Data

(63) Continuation of application No. 17/589,210, filed on Jan. 31, 2022, now Pat. No. 11,928,692.

(51) Int. Cl.
*G06Q 30/016* (2023.01)

(52) U.S. Cl.
CPC .................................. *G06Q 30/016* (2013.01)

(58) Field of Classification Search
CPC ...... G06Q 30/00; G06Q 30/01; G06Q 30/015; G06Q 30/016; G06Q 30/012
See application file for complete search history.

(56) References Cited

U.S. PATENT DOCUMENTS 7,769,161 B1 8/2010 Hession et al.
8,583,466 B2 11/2013 Margulies et al.
9,160,851 B2 * 10/2015 Kugler ................. H04Q 3/0029
(Continued)

FOREIGN PATENT DOCUMENTS

CN 108287750 A * 7/2018 ......... G06F 9/45558
WO 201909952 A1 1/2019
WO WO-2019109952 A1 * 6/2019

OTHER PUBLICATIONS

Role based access control (Year: 2002).*
Chase, "Managing energy and server resources in hosting centers" (Year: 2001).

*Primary Examiner* — Sangeeta Bahl
(74) *Attorney, Agent, or Firm* — Young Basile Hanlon & MacFarlane, P.C.

(57) ABSTRACT

A contact center service is configured, deployed, and operated for a limited term in connection with an event. Configurations to provide a contact center service for an event are defined according to a term of the event and one or more service features available for attendees of the event to use. The contact center service is deployed at or prior to the start of the term of the event according to the configurations. Responsive to deploying the contact center service, the service features are facilitated via the contact center service, such as to enable contact center engagements between agents and users as event attendees. The contact center service is eventually terminated based on an expiration of the term. Contact center as a service software used to configure, deploy, and operate the contact center service may be integrated with an event system used to implement the event.

20 Claims, 8 Drawing Sheets

800

802 OBTAIN INPUT SPECIFYING EVENT-BASED CONTACT CENTER REQUEST

804 DEFINE CONFIGURATIONS FOR CONTACT CENTER SERVICE AND FEATURES DURING EVENT BASED ON INPUT

806 DEPLOY CONTACT CENTER SERVICE ACCORDING TO CONFIGURATIONS

808 FACILITATE SERVICE FEATURES VIA DEPLOYED CONTACT CENTER SERVICE

810 TERMINATE CONTACT CENTER SERVICE BASED ON EXPIRATION OF EVENT TERM

(56) References Cited

U.S. PATENT DOCUMENTS

| | | | | |
|---|---|---|---|---|
| 10,003,691 | B1 | 6/2018 | Agarwa et al. | |
| 10,015,315 | B2 | 7/2018 | Kumar et al. | |
| 2014/0079207 | A1 | 3/2014 | Zhakov et al. | |
| 2015/0200786 | A1* | 7/2015 | Stott | G06Q 10/1093 709/204 |
| 2017/0026830 | A1* | 1/2017 | Singh | H04L 63/107 |
| 2018/0205825 | A1* | 7/2018 | Vymenets | H04M 3/5175 |
| 2021/0306463 | A1* | 9/2021 | Doumar | G06K 19/06037 |

* cited by examiner

Robert Robertson 123-456-7890

Could I please have a copy of my signed event form?

Hello! The Brand Festival has ended, and the contact center is no longer available. For assistance, please call 555-123-4567.

Thank you!

EVENT-BASED CONTACT CENTER DEPLOYMENT AND TERMINATION

CROSS-REFERENCE TO RELATED APPLICATION(S)

This application is a continuation of U.S. patent application Ser. No. 17/589,210, filed Jan. 31, 2022, the entire disclosure of which is hereby incorporated by reference.

FIELD

This disclosure generally relates to event-based contact center deployment, in particular, the time-limited deployment and facilitation of service features of a contact center service in connection with an event.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
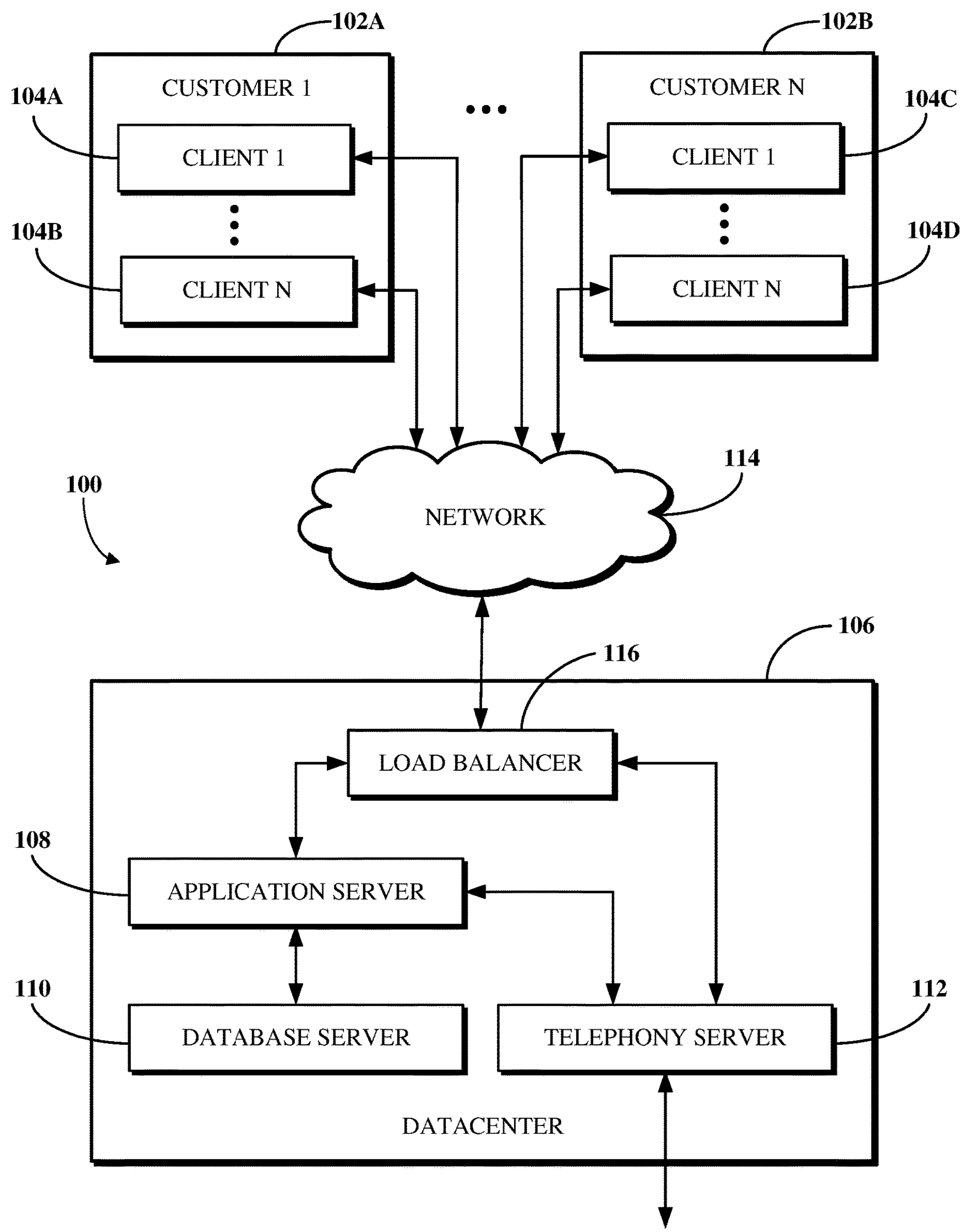
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

Contact centers are complicated products which conventionally require extensive time periods and expense for configuration and deployment. Much of the complication associated with the deployment of a contact center relates to technical considerations, such as the deployment of server and client hardware and software resources for facilitating contact center services, the connection of such resources to existing systems (e.g., websites or mobile applications), and the establishing of varying privileges for agent and supervisor activities within the contact center. The significant upfront time and monetary cost required to configure and deploy a contact center is acceptable in view of the generally long term during which a contact center customer for which the contact center is implemented will operate the contact center. That is, a typical contact center operator will incorporate the contact center as the front-facing customer support experience for their business or brand and thus spend considerable effort to encourage their users to engage with it regularly.

However, these timing and expense requirements create material barriers to entry for entities which seek out contact center services for limited-time use. For example, many entities may not have a need to provide year-round customer support via a contact center, such as due to their size or scope of operations. Instead, such entities may have a need for contact center services during a specific term, such as during a seasonal or time-limited (e.g., ad hoc) event. While not necessarily always the case, such events generally have large attendance and therefore high volume customer support demand which is inefficient to address using conventional, non-contact center approaches (e.g., via general access telephone numbers or email addresses). Examples of such seasonal events may include annual events such as company or industry expos, music festivals, workshops, show residencies, college admissions fairs, career fairs, and telethons, or time-limited events such as real estate showings, estate sales, bankruptcy sales, sports matches, movie premiers, and e-sports tournaments. While there is a critical need for these entities to be able to access contact center services, the barriers to entry described above, ultimately due to the technical requirements involved in implementing a contact center, generally prohibit contact center service access for such entities and thus for their users.

Implementations of this disclosure address problems such as these by configuring, deploying, and operating a contact center service for a limited term in connection with an event. Configurations to provide a contact center service for an event are defined according to a term of the event and one or more service features available for attendees of the event to use. The contact center service is deployed at or prior to the start of the term of the event according to the configurations. Responsive to deploying the contact center service, the service features are facilitated via the contact center service, such as to enable contact center engagements between agents and users as event attendees. The contact center service is eventually terminated based on an expiration of the term. CCaaS software used to configure, deploy, and operate the contact center service may be integrated with an event system used to implement the event.

To describe some implementations in greater detail, reference is first made to examples of hardware and software structures used to implement a system for event-based contact center deployment. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
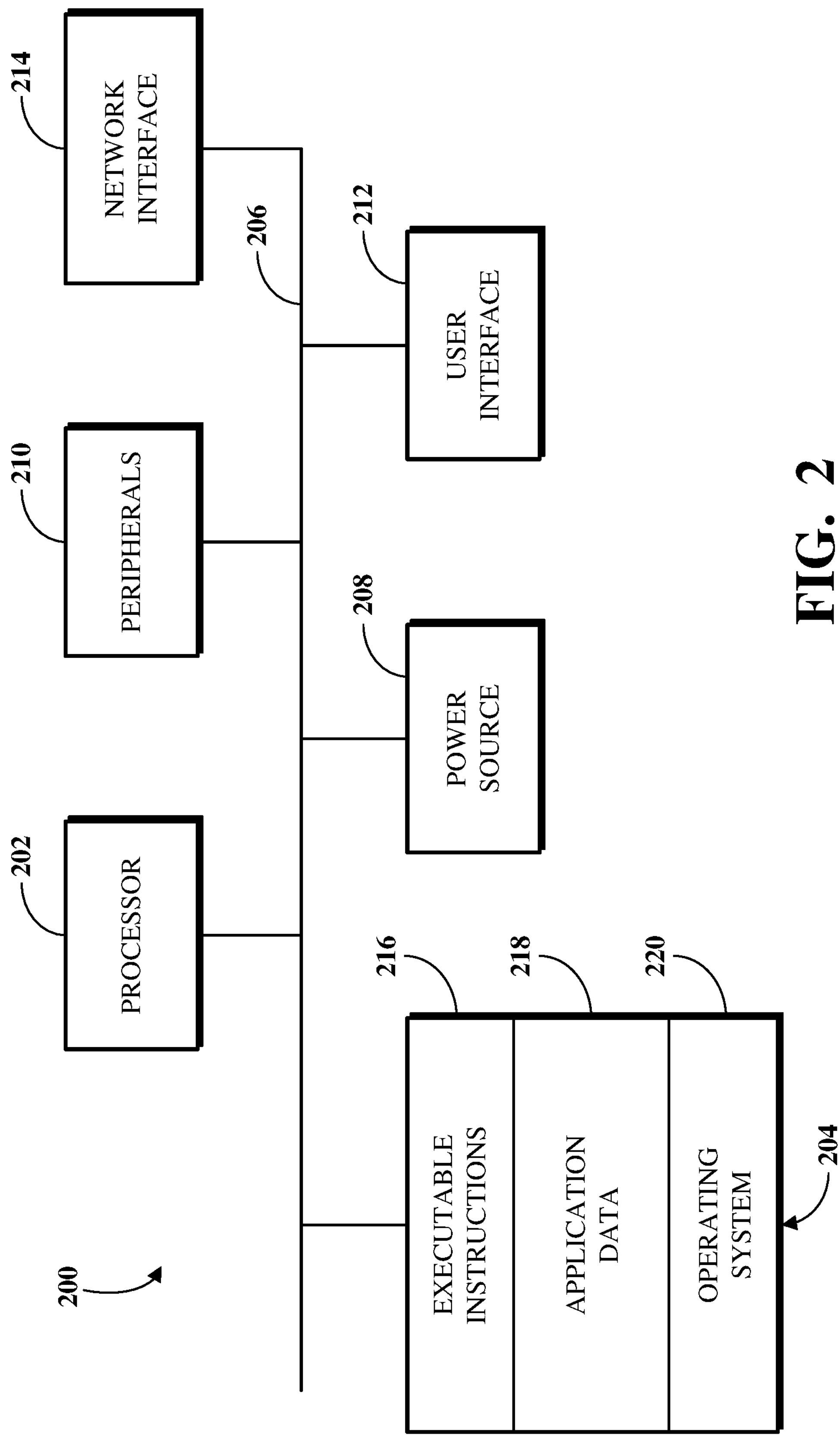
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
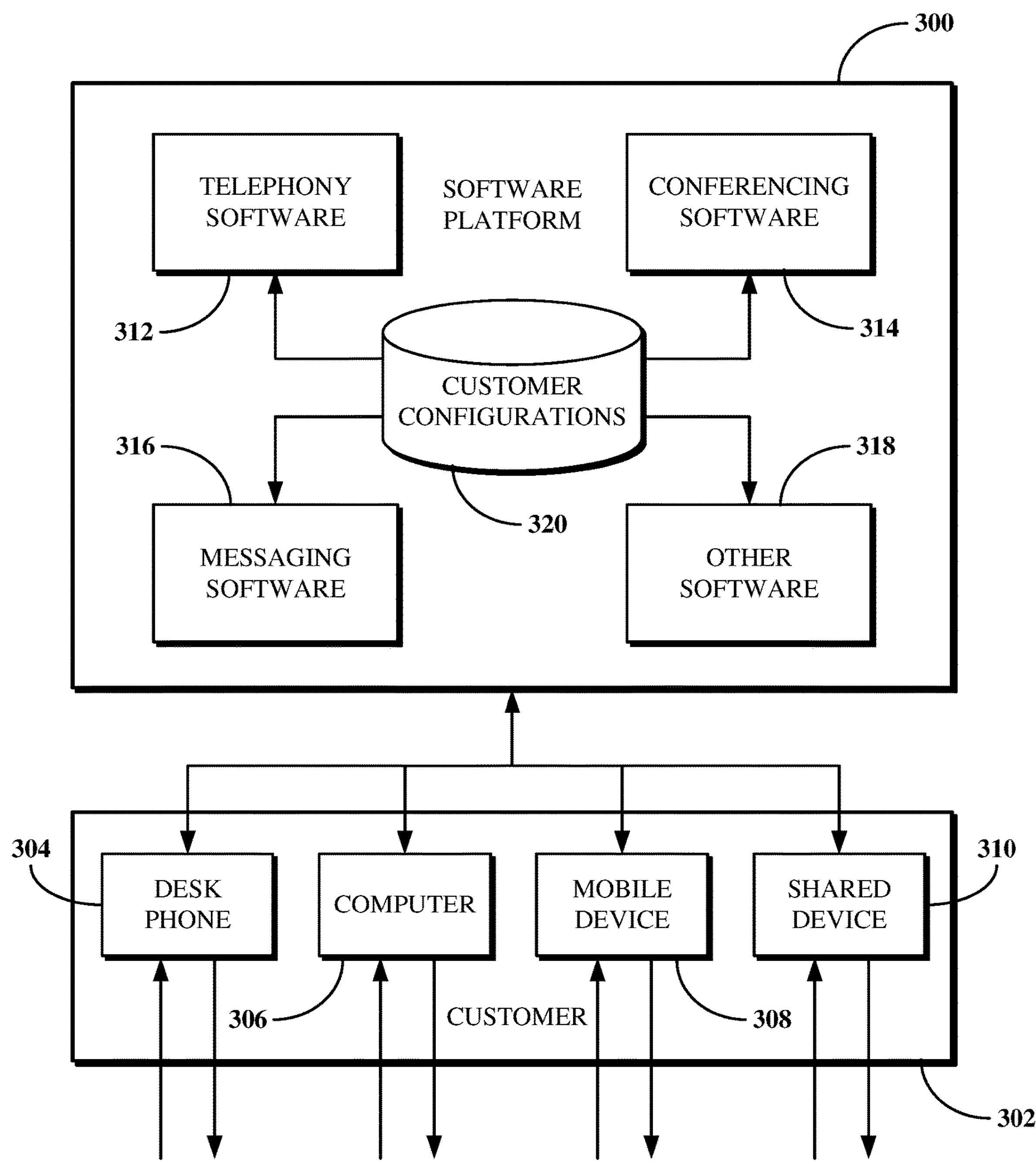
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for event-based contact center deployment.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
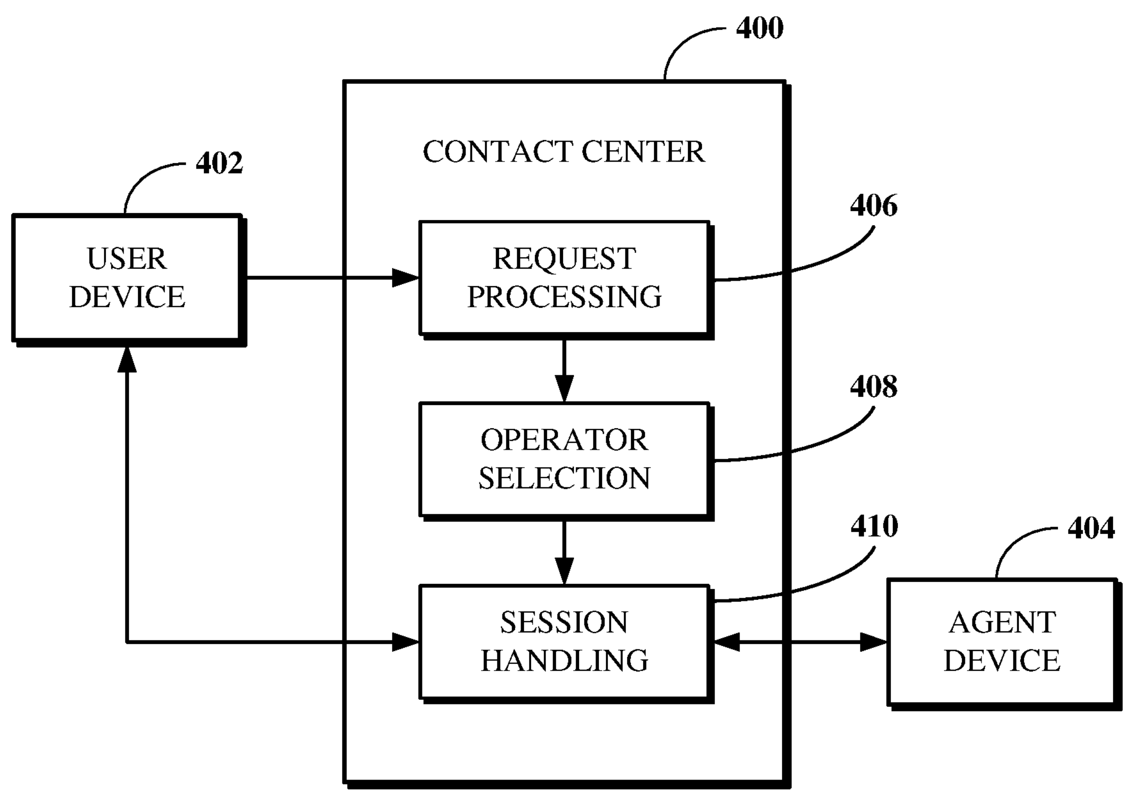
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The agent selection software 408 uses output of the request processing software 406 including the information associated with the request to select a contact center agent to handle the request. The contact center agent may be a human agent or a non-human agent, for example, a chat bot or other bot. The agent selection software 408 may first determine an agent group associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over one or more modalities. For example, a contact center agent may be part of a first agent group that handles accounting-related requests over all of the telephony, video, chat, and text modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

The contact center system shown in FIG. 4 thus implements a contact center service accessible via the contact center 400 for contact center users, such as the user of the user device 402, to engage with contact center agents, such as the agent using the agent device 404. In particular, the contact center service implemented by the contact center system shown in FIG. 4 may be a contact center service deployed for an event. Deployment of a contact center service for an event includes enabling various hardware and/or software resources to be used by the contact center system to facilitate service features, such as contact center engagements over one or more modalities, as disclosed herein. The deployment of the contact center service is based on configurations, which may, for example, identify the service features to be provided to users of the contact center service (e.g., attendees of the event for which the contact center service is deployed, also referred to as event attendees) and a term of the event for which the contact center service will be available to such users.

The contact center service may implemented by or using CCaaS functionality of a software platform, for example, the software platform 300 shown in FIG. 3. For example, CCaaS functionality of a software platform may refer to CCaaS software usable to configure, deploy, and operate a contact center service for a limited period of time, such as for the term of an event. Because the CCaaS software enables contact center service access for a limited period of time, the CCaaS functionality may be a subscription-based offering of the software platform. For example, the software platform may further include an event system usable to configure events for which a contact center service may be configured, deployed, and operated in connection with the CCaaS functionality of the software platform. A user of the software platform who is configuring an event using such an event system may access CCaaS software to configure a contact center service for deployment in connection with the event. The configuration of the contact center service may include configurations for a front-end portion with which event attendees interface to access the service features. In some cases, for example, the front-end portion may be or represent a virtual receptionist that uses natural language processing, IVR prompting, or the like to connect event attendees to the relevant service feature (e.g., communication software) over which they may engage with contact center agents.

Figure 5:
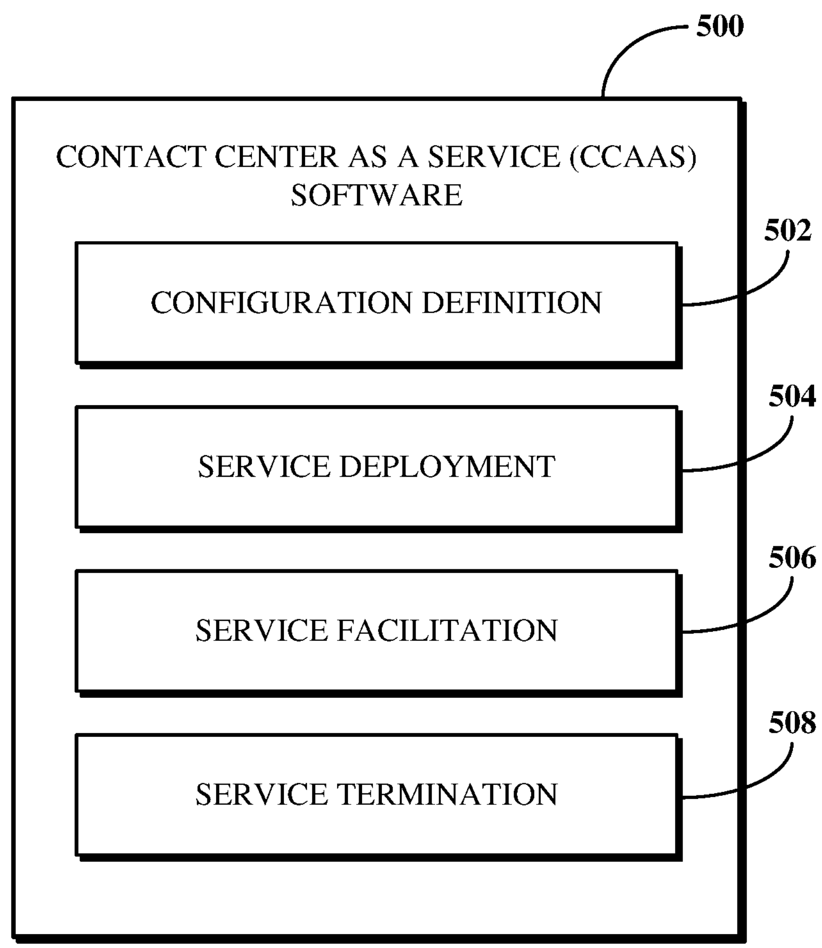
FIG. 5 is a block diagram of example functionality of contact center as a service (CCaaS) software used for event-based contact center deployment.

To further explain CCaaS functionality as may be used with a software platform or otherwise in connection with the configuration, deployment, and operation of a contact center service, reference is made to FIG. 5, which is a block diagram of example functionality of CCaaS software 500 used for event-based contact center deployment. The CCaaS software 500 includes tools, such as programs, subprograms, functions, routines, subroutines, operations, and/or the like for deploying and facilitating time-limited contact center service features in connection with an event, as described above. As shown, the CCaaS software 500 includes a configuration definition tool 502, a service deployment tool 504, a service facilitation tool 506, and a service termination tool 508.

The configuration definition tool 502 is used to define configurations to provide a contact center service for an event according to a term of the event and one or more service features to be available for attendees of the event to use. The configurations represent settings defined for a contact center service to be implemented in connection with the event. The configurations may, for example, be defined based on input obtained from an operator associated with the event, such as an event manager. For example, the configurations may specify the term of the event (e.g., a limited period of time indicated based on a total number of days or weeks starting from a start date or based on one or both of a defined start date or a defined end date) and one or more service features.

The service features may correspond to one or more features of a contact center, including various communication software over which the contact center may be accessed across modalities, settings for contact center users and/or agents to use to access or participate in contact center engagements with one another, or other features usable by or in connection with a contact center service. In one example, the service features may enable contact center engagements over at least one of a telephony modality, a video modality, a chat modality, or a text message modality, such as using the software 312 through 318 shown in FIG. 3, or other modalities, for example social media. In particular, the configurations may indicate selections of one or more communications software services available to facilitate engagements between users and agents of the contact center service. Thus, an operator for whom the contact center service is being configured may selectively define the configurations to enable engagements over all or some modalities conventionally available through contact centers.

The configuration definition tool 502 may include one or more graphical user interfaces configured to obtain the input from an operator device associated with the operator. For example, where the CCaaS software 500 is implemented as part of a web service, the graphical user interfaces may be or include forms within which some or all of the configurations may be expressed. Alternatively, the input from the operator device may be separately obtained and processed by the configuration definition tool 502, such as using natural language processing, to determine the term of the event and the one or more service features. In some cases, the configurations may further correspond to one or more of an agent distribution approach used for selecting agents to address contact center requests from the event attendees, limitations on numbers of agents which may address engagements over some or all of the term of the event, information usable to configure a virtual receptionist interfacing with event attendees when they access the service features of the contact center service, or the like.

The service deployment tool 504 deploys the contact center service according to the configurations. In particular, the service deployment tool 504 instantiates hardware and/or software resources used to implement the contact center service at or before the beginning of the term of the event. The deployment of the contact center service enables engagements between event attendees and agents over the service features for which the contact center service is configured. Deploying the contact center service can include determining some amount of available server space dedicated for CCaaS processing to be provisioned for the contact center service. Deploying the contact center service can further include connecting end points (e.g., telephone numbers or SIP uniform resource locators (URLs)) to the communication services associated with the service features. For example, the end points may be specified in the configurations. Deploying the contact center service can further include establishing access privileges for contact center agents of the contact center service.

The service deployment tool 504 deploys the contact center service from a server used to implement the CCaaS software 500. For example, the service deployment tool 504 may be configured to instantiate the deployment at the start of the term of the event as indicated by the configurations. Alternatively, the service deployment tool 504 may enable control over deployment of the contact center service via a remote device. For example, the service deployment tool 504 may generate an executable file (e.g., a .exe file on Windows® devices) and transmit the executable file or otherwise make it available to an operator device associated with the event. In such a case, the user of the operator device may deploy or otherwise cause a deployment of the contact center by executing the executable file. For example, the executable file may include scripts, code, or the like used to communicate instructions to a server to cause the deployment of the contact center service.

The service facilitation tool 506 facilitates the one or more service features via the contact center service responsive to the service deployment tool 504 deploying the contact center service according to the configurations. Facilitating the one or more service features includes enabling contact center engagements between event attendees as contact center users and contact center agents over the communication software services associated with those service features, such as instances of the software 312 through 318 deployed for use with the contact center service. Facilitating the service features can include using a virtual receptionist configured to interface with event attendees to determine how to route requests for contact center engagements, such as described above with respect to the request processing software 406 shown in FIG. 4.

In some implementations, the service facilitation tool 506 facilitates the one or more service features by determining an extension to the term of the event based on a detected change to the event. For example, a change to the event can be detected based on changes to information accessible within an event system in communication with the contact center service, input received from the event system or another device (e.g., an operator device), or by scraping data from an official website or mobile application associated with the event. In such a case, the expiration of the term instead occurs at an end of the determined extension.

In some implementations, the service facilitation tool 506 facilitates the one or more service features by scaling resources available for facilitating the one or more service features based on user traffic reported from an event system associated with the event. For example, the service facilitation tool 506 can monitor user traffic of the contact center service during the term of the event and dynamically scale resources available for facilitating the one or more service features based on the monitored user traffic. In some such implementations, the dynamic scaling can refer to increasing or decreasing one or more of an amount of provisioned server space, a number of licenses available for communication software access, or a number of contact center agents and associated agent devices configured to participate in contact center engagements.

The service termination tool 508 terminates the contact center service based on an expiration of the term of the event. Terminating the contact center service includes deprovisioning server space used for the contact center service, disconnecting end points connected to the communication software associated with the service features, and revoking access privileges established for the contact center agents. In some cases, the termination may be automatic upon a specified date and/or time being reached, such as which may be indicated within the configurations. In some cases, the termination may be effected by manual operation, such as an operator device executing a file configured to cause one or more scripts, code, or the like to run to cause the above deprovisioning, disconnection, and revocation.

In some implementations, a service number may be established by the operator of the event for event attendees to access support services for the event after the termination of the contact center service. For example, the service number may be or include a telephone number accessible over telephony services. In some such implementations, responsive to the termination of the contact center service, the telephone number may be mapped to a telephony endpoint configured for event attendee support after the expiration of the term of the event. For example, event attendees who initiate contact center engagements after the termination of the contact center service may be provided with a pre-recorded message, subject to the modality of the initiation, which indicates for the event attendees to use the service number to access support services in view of the expiration of the term of the event.

In some implementations, the CCaaS software 500 may be accessed by a user of an operator device. For example, the CCaaS software 500 may include a front-end with user interfaces for obtaining input from the operator device and/or providing output to the operator device (e.g., confirmations of the configurations or an executable file for deploying or causing the deployment of the contact center service). In some implementations, the CCaaS software 500 may be accessed by another system of a software platform, such as the software platform 300. For example, the software platform may include an event system usable to configure the event for which the contact center service is deployed. In such a case, the event system may interface with the CCaaS software 500 to provide the configurations, such as based on input obtained from an operator device via the event system.

Furthermore, and although the tools 502 through 508 are shown as functionality of the CCaaS software 500 as a single piece of software, in some implementations, some or all of the tools 502 through 508 may exist outside of the CCaaS software 500 and/or a software platform configured to use the CCaaS software 500 (e.g., the software platform 300 shown in FIG. 3) may exclude the CCaaS software 500 while still including some or all of tools 502 through 508, individually or in combination, in some form elsewhere. In some implementations, the CCaaS software 500 may include tools other than or in addition to one or more of the tools 502 through 508.

In some implementations, the CCaaS software 500 may include a contact center service template creation tool for generating a contact center service template based on the configurations defined for a contact center service and storing the contact center service template for future use by the same contact center operator and/or by one or more other contact center operators. A contact center service template may refer to particular configurations of service features usable for a contact center service. For example, at least some contact center service templates may correspond to specific types of events, lengths of events, anticipated event attendance totals, or industries putting on the events. A contact center service template may be selectable by an operator of the event to easily configure the contact center service according to expectations of contact center needs during the event. One or more default contact center service templates may be provided via the CCaaS software 500. Additionally, or alternatively, event operators may optionally store data indicative of their configurations as contact center service templates for their future use and/or for future use by other event operators.

In some implementations, the CCaaS software 500 can include a workflow editor tool usable to configure user experience workflows through engagements via the contact center service. For example, the workflow editor tool may be a visual editor tool for enabling event operators, as workflow designers, to configure user experience workflows based on input received for various object types selectively arranged within the user experience workflows. Generally, a user experience workflow represents one or more sequences of operations which are performed to move a contact center user through a contact center engagement starting from the request being received from the user device of the user and ending with the user device being connected to a private session with an agent device. The user traverses a user experience workflow as it is configured to interact with objects along one or more paths thereof. Examples of those objects include, but are not limited to, queue objects, menu objects, input objects, forwarding objects, media playback objects, condition objects, and messaging objects. The user experience workflow can be bound to a contact center entry point (e.g., a telephone number or SIP URL used to access the contact center) to cause users who access the contact center therefrom to go through the workflow.

In some implementations, the CCaaS deployment software 500 may include an external service integration tool for integrating functionality of such an external service within the one or more service features of the contact center service. For example, an external service may refer to a social media platform. In some such implementations, the external service integration tool may integrate post sharing, livestreaming, or similar functionality of the external service within the one or more service features of the contact center service. For example, the external service integration tool may, via the configurations which specify the integrations to use, enable broadcasts from the contact center service over one or more such external services.

Figure 6:
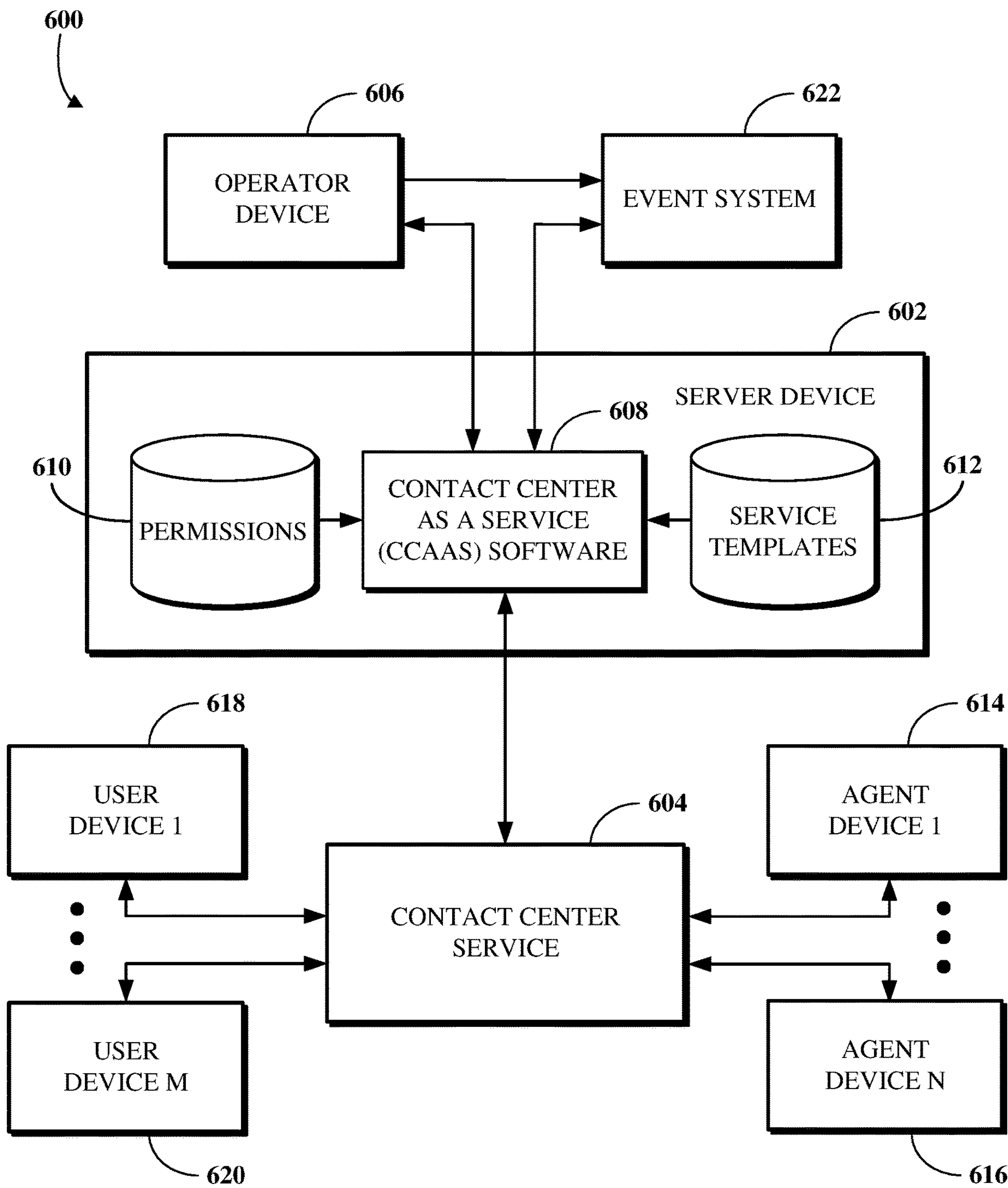
FIG. 6 is a block diagram of an example of a system for event-based contact center deployment.

FIG. 6 is a block diagram of an example of a system 600 for event-based contact center deployment. The system 600 includes a server device 602 which runs software and stores data used to implement a contact center service 604 based on input obtained from an operator device 606. The server device 602 may, for example, be a server used by a software platform, such as the software platform 300 shown in FIG. 3. For example, the server device 602 may be the application server 108 and/or the database server 110 shown in FIG. 1. The system 600 provides the contact center service 604 based on configurations defined according to the input obtained from the operator device 606. For example, the contact center service 604 may be or otherwise represent services implemented by the contact center system 400 shown in FIG. 4. The operator device 606 is a client or non-client device associated with an entity (e.g., a person or company) for which the contact center service 604 is being implemented and which will directly or indirectly operate the contact center service 604.

The software run at the server device 602 includes CCaaS software 608, which may, for example, be the CCaaS software 500 shown in FIG. 5. For example, the CCaaS software 608 may be used to define configurations to provide the contact center service 604 for an event according to a term of the event and one or more service features available for attendees of the event to use, deploy the contact center service 604 according to the configurations, facilitate the one or more service features via the contact center service 604, and terminate the contact center service 604 based on an expiration of the term.

The data stored at the server device 602 includes permission data stored in a permission data store 610 and contact center service template data stored in a service templates data store 612. The permission data includes or otherwise refers to permissions established for the contact center service 604. For example, the permissions may be contact center agent permissions established to enable contact center agents, such as using agent devices including an agent device 1 614 through an agent device M 616 (in which M is an integer greater than or equal to 2) to participate in engagements with contact center users, such as using user devices including a user device 1 618 through N (in which Nis an integer greater than or equal to 2). In another example, the permissions may be communication service permissions, such as licenses granted to allow the use of certain communication software to facilitate service features of the contact center service 604. The contact center service template data includes or otherwise refers to contact center service templates selectable by the user of the operator device 606 to define configurations for the contact center service 604.

In some implementations, the CCaaS software 608 is configured to integrate with an event system 622 to obtain input usable to define the configurations for the contact center service. For example, the input may be obtained from the event system 622 after the input is provided to the event system 622 from the operator device 606 or another operator device. In another example, the input may be obtained from the event system 622 without direction from the operator device 606 or another operator device, such as where the input is generated using machine learning functionality or like automation by or for the event system 622.

Figures 7A, 7B:
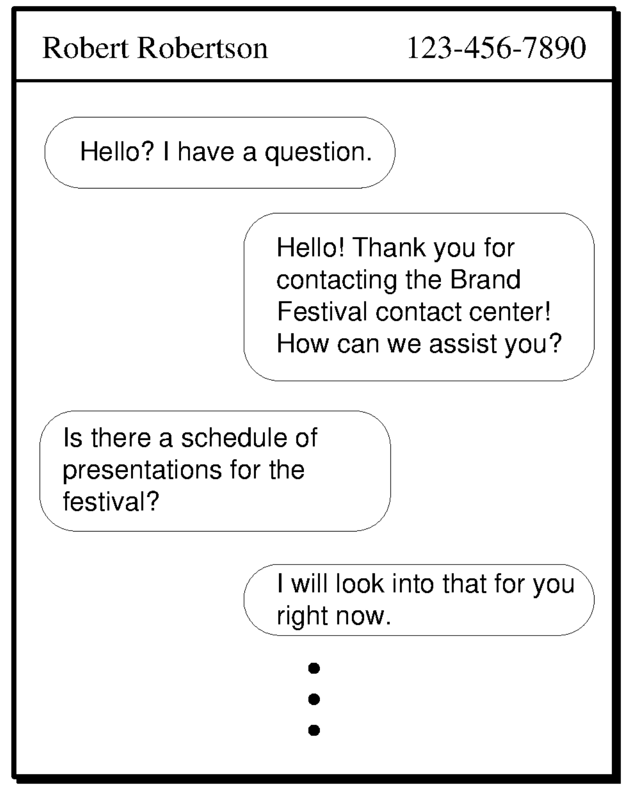
FIGS. 7A-B are illustrations of examples of communications between an event attendee and a contact center service deployed in connection with an event.

FIGS. 7A-B are illustrations of examples of communications between an event attendee and a contact center service deployed in connection with an event. The communications shown in FIGS. 7A-B are messages communicated over the text messaging modality for contact center engagement, such as using the messaging software 316 shown in FIG. 3, as a service feature for a contact center service deployed for an event. For example, the contact center service may be the contact center service 604 shown in FIG. 6.

Referring first to FIG. 7A, a text message conversation is shown between an event attendee named Robert Robertson as a contact center user and an agent of a contact center service deployed for the event attended by the event attendee. In particular, the initiating text message from the event attendee indicating that he has a question about the event is received during a term of the event, and thus while the contact center service remains deployed. The contact center service, via a human or non-human agent (e.g., a chatbot), responds by thanking the event attendee for contacting the contact center and asking for further detail about the inquiry. The discussion then progresses to the satisfaction of the event attendee.

Referring next to FIG. 7B, a different text message conversation is shown between the same event attendee and the same contact center service. However, the initiating text message of this conversation is received after an expiration of the term of the event, and thus after the termination of the contact center service. The contact center service, via a human or non-human agent, responds with a pre-defined message indicating that the event has ended and that inquiries should instead now be directed to a specified endpoint, such as a telephone number to a support line associated with the event. For example, the telephone number may have been mapped to that specified endpoint configured for event attendee support after the expiration of the term responsive to the termination of the contact center service.

Although the examples shown represent communications over the text message modality, similar communications may be used for other modalities in the same manner as described herein. For example, where the communication of FIG. 7B occurs over the telephony modality instead of the text message modality as shown, a pre-recorded message may be played to the event attendee indicating the manner by which post-event inquiries may be addressed. Alternatively, the telephone number dialed to access the contact center service after the termination thereof may be remapped, responsive to the termination of the contact center service, to a telephony endpoint configured for event attendee support after the expiration of the term of the event.

Figure 8:
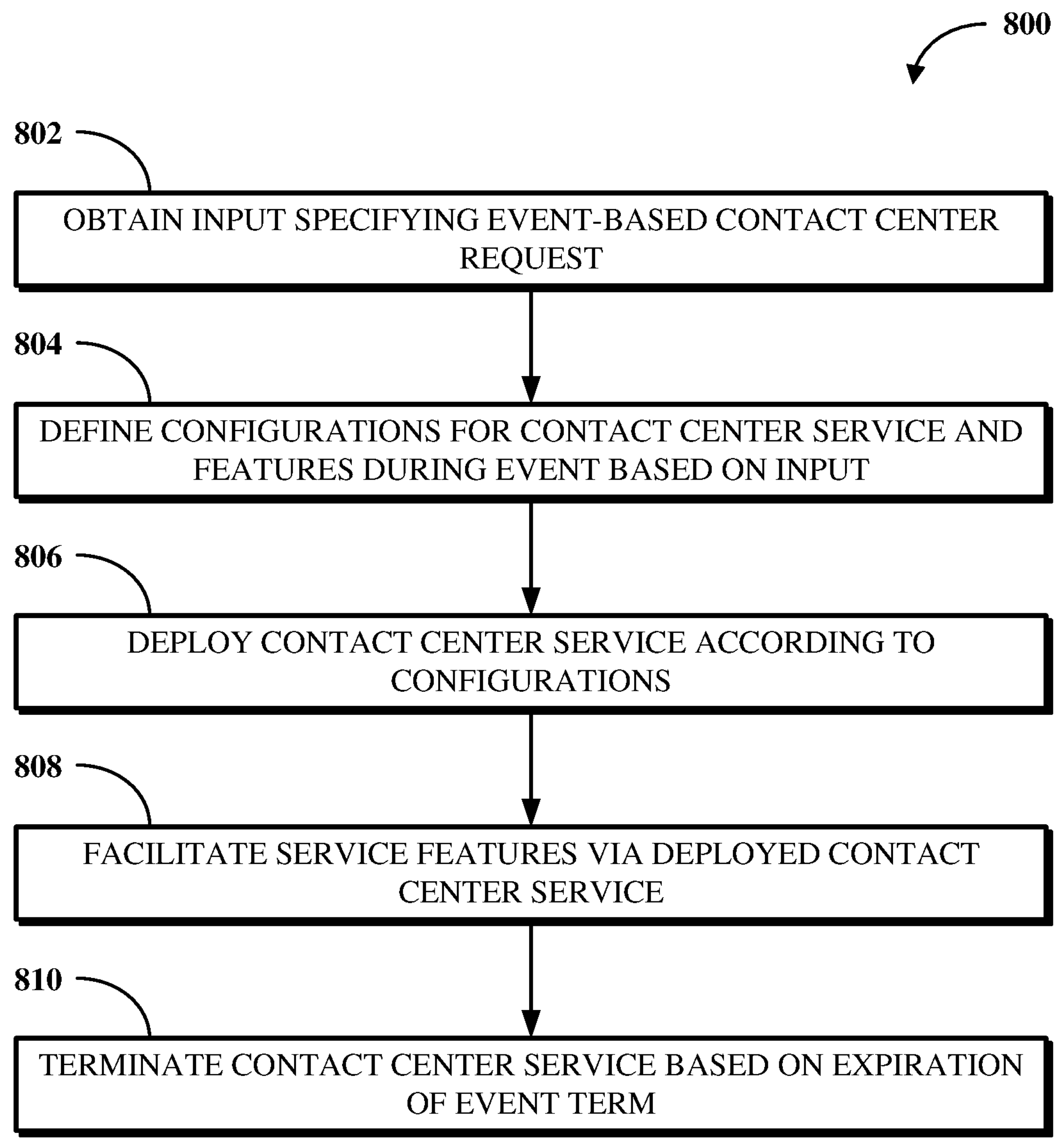
FIG. 8 is a flowchart of an example of a technique for event-based contact center deployment.

To further describe some implementations in greater detail, reference is next made to examples of techniques which may be performed by or using a system for event-based contact center deployment. FIG. 8 is a flowchart of an example of a technique 800 for event-based contact center deployment. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, input specifying an event-based contact center request is obtained. The event-based contact center request is a request for a contact center service in connection within an event. The input may be obtained from an operator device. Alternatively, the input may be obtained from an event system in communication with software used to configure the contact center service, for example, CCaaS software.

At 804, configurations for the contact center service and one or more service features to provide during the event are defined based on the input. In some cases, the input may specifically indicate the configurations, such as by specifying the one or more service features, a term of the event, and/or the like. In some cases, the input may represent a selection of a contact center service template to indicate the service features, along with some indication of the term. In some implementations, where the input specifically indicates the configurations, the input may be used to generate a contact center service template based on those configurations.

At 806, the contact center service is deployed according to the configurations. The deployment of the contact center service according to the configurations includes or otherwise refers to the provision of hardware and/or software resources for implementing the contact center service and functionality thereof for the duration of the term of the event. The deployment is according to the configurations based on the specification of the service features and the term of the event by those configurations.

At 808, responsive to the deployment of the contact center service, the one or more service features are facilitated via the deployed contact center service. Facilitating the service features includes enabling contact center engagements between users, such as event attendees, and agents over one or modalities based on the communication software available for use with the contact center service based on the configurations.

At 810, the contact center service is terminated based on an expiration of the term of the event. The termination of the contact center service may be based on an original or updated end of the term of the event. The termination of the contact center service includes the deprovisioning of the hardware and/or software resources which were provisioned for the deployment of the contact center service. In some implementations, a service number such as a telephone number can be mapped responsive to the termination of the contact center service to an endpoint to enable support services in connection with the event after the term ends.

The implementations of this disclosure correspond to methods, non-transitory computer readable media, apparatuses, systems, devices, and the like. In some implementations, a method comprises defining configurations to provide a contact center service for an event according to a term of the event and one or more service features available for attendees of the event to use; responsive to deploying the contact center service according to the configurations, facilitating the one or more service features via the contact center service; and terminating the contact center service based on an expiration of the term. In some implementations, a non-transitory computer readable medium stores instructions operable to cause one or more processors to perform operations comprising defining configurations to provide a contact center service for an event according to a term of the event and one or more service features available for attendees of the event to use; responsive to deploying the contact center service according to the configurations, facilitating the one or more service features via the contact center service; and terminating the contact center service based on an expiration of the term. In some implementations, an apparatus comprises a memory and a processor configured to execute instructions stored in the memory to define configurations to provide a contact center service for an event according to a term of the event and one or more service features available for attendees of the event to use; responsive to a deployment of the contact center service according to the configurations, facilitate the one or more service features via the contact center service; and terminate the contact center service based on an expiration of the term.

In some implementations of the method, non-transitory computer readable medium, or apparatus, the configurations are defined based on a contact center service template selected by an operator of the event.

In some implementations of the method, non-transitory computer readable medium, or apparatus, access to the one or more service features facilitated via the contact center service is configured by an event system used to implement the event.

In some implementations of the method, non-transitory computer readable medium, or apparatus, the one or more service features are facilitated using a virtual receptionist configured to interface with the attendees of the event.

In some implementations of the method, non-transitory computer readable medium, or apparatus, the contact center service is deployed via an executable file executed at an operator device.

In some implementations of the method, non-transitory computer readable medium, or apparatus, the configurations enable broadcasts from the contact center service over one or more external services.

In some implementations of the method, non-transitory computer readable medium, or apparatus, an extension to the term is determined based on a detected change to the event, wherein the expiration of the term occurs at an end of the extension.

In some implementations of the method, non-transitory computer readable medium, or apparatus, facilitating the one or more service features via the contact center service comprises scaling resources available for facilitating the one or more service features based on user traffic reported from an event system associated with the event.

In some implementations of the method, non-transitory computer readable medium, or apparatus, terminating the contact center service based on the expiration of the term comprises revoking access privileges established for contact center agents of the contact center service upon the expiration of the term.

In some implementations of the method, non-transitory computer readable medium, or apparatus, user traffic of the contact center service is monitored during the term; and resources available for facilitating the one or more service features are dynamically scaled based on the monitored user traffic.

In some implementations of the method, non-transitory computer readable medium, or apparatus, a selection of a contact center service template from a plurality of contact center service templates available for the contact center service is received, wherein the configurations are defined based on the selection of the contact center service template.

In some implementations of the method, non-transitory computer readable medium, or apparatus, the contact center service is configured to use a virtual receptionist to route contact center engagement requests received from event attendee devices to contact center agent devices.

In some implementations of the method, non-transitory computer readable medium, or apparatus, the event is one of an expo, festival, workshop, show residency, college admissions fair, career fair, telethon, real estate showing, estate sale, bankruptcy sale, sports match, movie premier, or e-sports tournament.

In some implementations of the method, non-transitory computer readable medium, or apparatus, the contact center system integrates with an event system associated with the event, wherein the facilitation of the one or more service features is based on data obtained from the event system.

In some implementations of the method, non-transitory computer readable medium, or apparatus, access privileges for contact center agents of the contact center service are established in connection with the deployment of the contact center service.

In some implementations of the method, non-transitory computer readable medium, or apparatus, an executable file is generated for deployment of the contact center service based on the configurations.

In some implementations of the method, non-transitory computer readable medium, or apparatus, a service feature of the one or more service features is accessed using a telephone number, and, responsive to the termination of the contact center service, the telephone number is mapped to a telephony endpoint configured for event attendee support after the expiration of the term.

In some implementations of the method, non-transitory computer readable medium, or apparatus, the one or more service features correspond to contact center agent engagements over at least one of a telephony modality, a video modality, a chat modality, a text message modality, or a social media modality.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, by a server device, a request to provide a contact center service for an event and configurations for the contact center service;

deploying, by the server device, the contact center service for the event based on the request and the configurations;

monitoring, by the server device based on the deployment of the contact center service, user traffic of the contact center service at one or more times throughout the event;

scaling, by the server device based on the user traffic, a number of access privileges established for end points to connect to the contact center service and an amount of server space provisioned for the contact center service; and executing, by the server device, an executable file to automatically terminate the contact center service upon an expiration of the event, wherein the execution of the executable file causes the server device to deprovision the server space for the contact center service and disconnect the end points from the contact center service.

2. The method of claim 1, wherein the configurations are defined based on a contact center service template selected by an operator of the event.

3. The method of claim 1, wherein access to one or more service features facilitated via the contact center service is configured by an event system used to implement the event.

4. The method of claim 1, wherein one or more service features of the contact center service are facilitated using a virtual receptionist configured to interface with attendees of the event.

5. The method of claim 1, wherein the executable file is a first executable file and deploying the contact center service for the event based on the request comprises:

deploying the contact center service via a second executable file executed at an operator device.

6. The method of claim 1, wherein the configurations enable broadcasts from the contact center service over one or more external services.

7. The method of claim 1, wherein the request comprises a term of the event, wherein the executable file is executed based on an expiration of the term of the event, and the method comprises:

determining an extension to the term based on a detected change to the event, wherein the expiration of the term occurs at an end of the extension.

8. The method of claim 1, comprising:

scaling resources available for facilitating one or more service features of the contact center service based on the user traffic, wherein the user traffic is reported from an event system associated with the event.

9. A non-transitory computer readable medium storing instructions operable to cause one or more processors to perform operations comprising:

receiving, by a server device, a request to provide a contact center service for an event and configurations for the contact center service;

deploying, by the server device, the contact center service for the event based on the request and the configurations;

monitoring, by the server device based on the deployment of the contact center service, user traffic of the contact center service at one or more times throughout the event;

scaling, by the server device based on the user traffic, a number of access privileges established for end points to connect to the contact center service and an amount of server space provisioned for the contact center service; and executing, by the server device, an executable file to automatically terminate the contact center service upon an expiration of the event, wherein the execution of the executable file causes the server device to deprovision the server space for the contact center service and disconnect the end points from the contact center service.

10. The non-transitory computer readable medium of claim 9, wherein the executable file is a first executable file and the operations comprise:

generating a second executable file that causes the deployment of the contact center service when executed, wherein the contact center service is based on a contact center service template that corresponds to the configurations, and wherein deploying the contact center service for the event based on the request comprises:

executing the first executable file.

11. The non-transitory computer readable medium of claim 10, the operations comprising:

receiving a selection of the contact center service template from a plurality of contact center service templates available for the contact center service, wherein the configurations are defined based on the selection of the contact center service template.

12. The non-transitory computer readable medium of claim 10, wherein scaling the number of access privileges established for the end points to connect to the contact center service and the amount of the server space provisioned for the contact center service comprises:

scaling a number of contact center agents deployed for contact center engagements based on the user traffic, wherein the execution of the first executable file causes the server device to revoke the access privileges established for the number of contact center agents.

13. The non-transitory computer readable medium of claim 9, wherein the contact center service is configured to use a virtual receptionist to route contact center engagement requests received from event attendee devices to contact center agent devices.

14. The non-transitory computer readable medium of claim 9, wherein the event is one of an expo, festival, workshop, show residency, college admissions fair, career fair, telethon, real estate showing, estate sale, bankruptcy sale, sports match, movie premier, or sports tournament.

15. An apparatus, comprising:

a memory; and a processor configured to execute instructions stored in the memory to:

receive a request to provide a contact center service for an event and configurations for the contact center service;

deploy, based on the request, the contact center service for the event and the configurations;

monitor, based on the deployment of the contact center service, user traffic of the contact center service at one or more times throughout the event;

scale, based on the user traffic, a number of access privileges established for end points to connect to the contact center service and an amount of server space provisioned for the contact center service; and execute an executable file to automatically terminate the contact center service upon an expiration of the event, wherein the execution of the executable file causes a deprovisioning of the server space for the contact center service and a disconnection of the end points from the contact center service.

16. The apparatus of claim 15, wherein the processor is configured to execute the instructions to:

integrate with an event system associated with the event, wherein one or more service features of the contact center service are facilitated based on data obtained from the event system.

17. The apparatus of claim 15, wherein the end points correspond to contact center agents of the contact center service and the processor is configured to execute the instructions to:

establish the access privileges for the contact center agents in connection with deployment of the contact center service.

18. The apparatus of claim 15, wherein the executable file is a first executable file and the processor is configured to execute the instructions to:

generate a second executable file that causes the deployment of the contact center service when executed, wherein the contact center service is based on a contact center service template that corresponds to the configurations; and executing the second executable file to deploy the contact center service.

19. The apparatus of claim 15, wherein a service feature of the contact center service is accessed using a telephone number, and wherein the processor is configured to execute the instructions to:

responsive to the termination of the contact center service, map the telephone number to a telephony endpoint configured for event attendee support.

20. The apparatus of claim 15, wherein the contact center service includes one or more service features that correspond to contact center agent engagements over at least one of a telephony modality, a video modality, a chat modality, a text message modality, or a social media modality.

* * * * *

UNITED STATES PATENT AND TRADEMARK OFFICE

CERTIFICATE OF CORRECTION

PATENT NO. : 12,340,378 B2
APPLICATION NO. : 18/436793
DATED : June 24, 2025
INVENTOR(S) : Jin Li and Xu Hua Li It is certified that error appears in the above-identified patent and that said Letters Patent is hereby corrected as shown below:

On the Title Page

(71) Applicant: Zoom Video Communications, Inc., San Jose, CA (US)
Should be:
(71) Applicant: Zoom Communications, Inc., San Jose, CA (US)

Signed and Sealed this
Twenty-sixth Day of August, 2025

Coke Morgan Stewart
*Acting Director of the United States Patent and Trademark Office*